(12) United States Patent
Kawaguchi et al.

(10) Patent No.: US 7,804,965 B2
(45) Date of Patent: Sep. 28, 2010

(54) MICROPHONE SYSTEM AND MICROPHONE APPARATUS

(75) Inventors: Takayoshi Kawaguchi, Kanagawa (JP); Hiroyuki Yasui, Kanagawa (JP)

(73) Assignee: Sony Corporation, Tokyo (JP)

( * ) Notice: Subject to any disclaimer, the term of this patent is extended or adjusted under 35 U.S.C. 154(b) by 1156 days.

(21) Appl. No.: 11/242,085

(22) Filed: Oct. 4, 2005

(65) Prior Publication Data

US 2006/0104457 A1 May 18, 2006

(30) Foreign Application Priority Data

Nov. 15, 2004 (JP) ............................. 2004-330743

(51) Int. Cl.
*H04B 3/00* (2006.01)
*H04H 20/47* (2008.01)
*H04R 5/00* (2006.01)

(52) U.S. Cl. ................................. 381/77; 381/2; 381/26; 381/122

(58) Field of Classification Search ............... 381/91, 381/92, 122, 77, 2, 26
See application file for complete search history.

(56) References Cited

U.S. PATENT DOCUMENTS

| | | | |
|---|---|---|---|
| 6,320,958 | B1 | 11/2001 | Sekine |
| 2003/0169890 | A1* | 9/2003 | Arvidsson .................... 381/92 |
| 2004/0105557 | A1* | 6/2004 | Matsuo ......................... 381/92 |
| 2006/0032979 | A1* | 2/2006 | Mitchell et al. ........... 244/118.6 |
| 2006/0195324 | A1* | 8/2006 | Birk et al. .................... 704/275 |

FOREIGN PATENT DOCUMENTS

| | | |
|---|---|---|
| JP | 09-163485 | 6/1997 |
| JP | 09-168133 | 6/1997 |
| JP | 09168133 | 6/1997 |
| JP | 2000049950 | * 7/1998 |
| JP | 10-229548 | 8/1998 |
| JP | 2000-23129 | 1/2000 |
| JP | 2000-049950 | 2/2000 |
| JP | 2000-069179 | 3/2000 |
| JP | 3379313 | 12/2002 |
| JP | 2003-087887 | 3/2003 |

OTHER PUBLICATIONS

European Search Report dated Jun. 23, 2010 (8 pages).

* cited by examiner

*Primary Examiner*—Vivian Chin
*Assistant Examiner*—Paul Kim
(74) *Attorney, Agent, or Firm*—Oblon, Spivak, McClelland, Maier & Neustadt, L.L.P.

(57) ABSTRACT

A microphone system including a main unit for controlling the entire system and microphones having cascade connections from the main unit assuming the main-unit side upstream and the opposite side downstream. The microphone includes communication control means for controlling data transmitted between the main unit and microphones, sound input means for converting collected sound into a digital signal, echo cancellation means for eliminating an echo component in the sound signal, and sound-information generation means for updating the sound information by adding the sound signal of the self-microphone to the sound information of the downstream microphones and upstream transmitting the up data including the updated sound information. The microphone transmits the down data transmitted from the main unit to the down-most microphone in sequence in accordance with the cascade connection and transmits the up data from the down-most microphone to the main unit in reverse sequence.

14 Claims, 8 Drawing Sheets

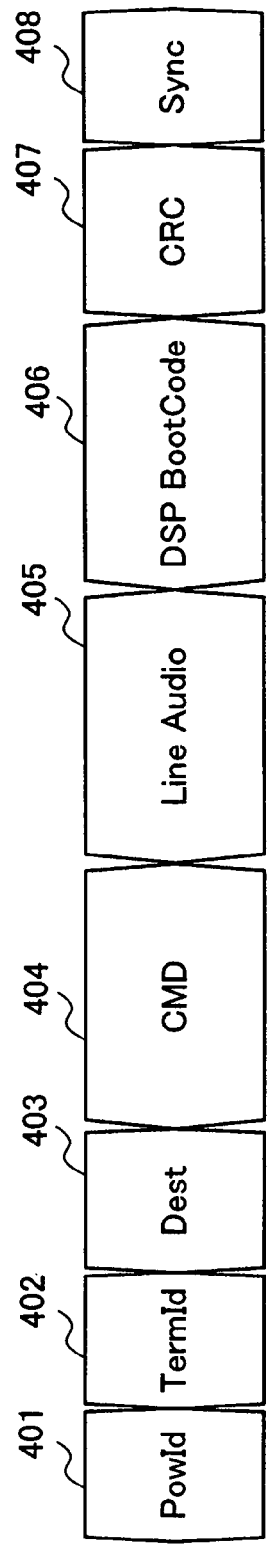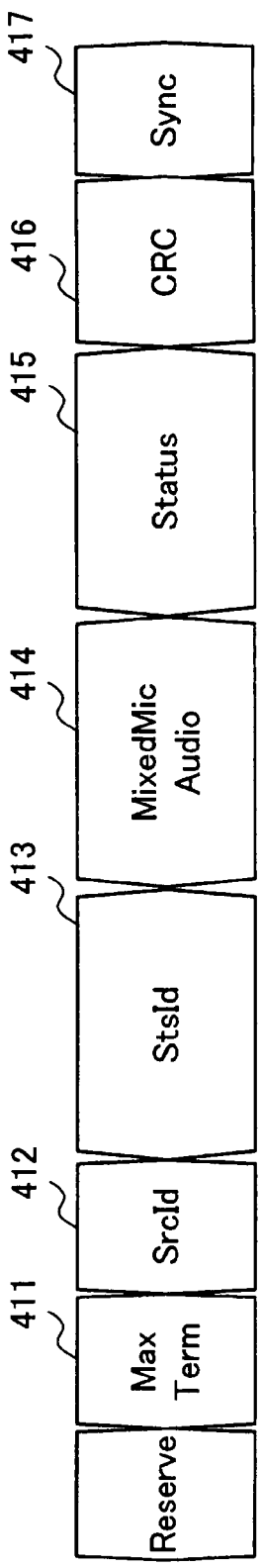
FIG. 4A  DOWN (MAIN UNIT → MICROPHONE)
FIG. 4B  UP (MICROPHONE → MAIN UNIT)

MICROPHONE SYSTEM AND MICROPHONE APPARATUS

CROSS REFERENCES TO RELATED APPLICATIONS

The present invention contains subject matter related to Japanese Patent Application JP 2004-330743 filed in the Japanese Patent Office on Nov. 15, 2004, the entire contents of which are incorporated herein by reference.

BACKGROUND OF THE INVENTION

1. Field of the Invention

The present invention relates to a microphone system and a microphone apparatus. More particularly, the present invention relates to a microphone system including a main unit for controlling the entire system and microphone apparatuses, having cascade connections from the main unit assuming the main-unit side to be upstream and the opposite side to be downstream, for transmitting sound signals in sequence, and to the microphone apparatus thereof.

2. Description of the Related Art

Up to now, conference systems, which allow holding a conference among many places by transmitting and receiving sound, video, etc., through a plurality of terminals installed in many places such as remote places, etc., have been built as represented by a television-conference system.

FIG. 8 is a configuration diagram illustrating an example of a known conference system among many places.

In the known conference system, terminal units 500, 510, and 520 disposed at each place are connected to a network, and sound data and video data are exchanged. Each terminal unit, for example the terminal unit 500 includes a microphone 501 for collecting sound and a speaker 503 for outputting sound. Similarly, the terminal unit 510 includes microphones 511 and 512 connected in a cascade and a speaker 513, and the terminal unit 520 includes microphones 521 and 522 and a speaker 523. In such a conference system, sound obtained by the microphone 501 is sound processed by the terminal unit 500, transmitted to the terminal units 510 and 520, and then output from the speakers 503, 513, and 523 of each of the terminal units, respectively.

Up to now, sound data or video data transmitted and received among the terminal units 500, 510, and 520 were transmitted and received through an unillustrated multi-point controller. However, a conference system which makes the multi-point controller unnecessary by transferring sound data or video data to the next stage in sequence among the terminal units connected in a cascade has been proposed (for example, Japanese Unexamined Patent Application Publication No. 2000-23129 (paragraph numbers [0012] to [0038], FIG. 1)). In a conference system having such a configuration, each terminal unit adds sound collected by a self-microphone to the sound data obtained from the previous stage in order to output the sound to the subsequent terminal unit, and outputs the sound produced by adding self-sound data to the obtained sound data to a speaker. Thus, it becomes possible to carry on a conversation simultaneously.

Also, for a microphone to be connected to a terminal unit, there is a microphone apparatus, such as microphones 511 and 512 of the terminal unit 510, which converts the voices of the speakers collected by individual microphones connected in a cascade into sound signals and generates a mixed sound signal obtained by mixing the self-sound signal with the sound signals from the other microphones connected in a cascade (for example, Japanese Patent Publication No. 3379313 Specification (paragraph numbers [0016] to [0018], FIG. 2)).

SUMMARY OF THE INVENTION

In the known conference system having the configuration described above, an analog signal is used for a sound signal transferred between a terminal unit and a microphone. Also, sound signal processing, for example, echo cancellation processing, addition processing of the sound signal collected by the microphone connected to that terminal unit to the sound signal relayed among terminal units, etc., are performed by the terminal units.

However, since processing on sound signals is performed by the terminal unit, in the case of multi-stage connection of microphones, there is a problem in that the sound quality is deteriorated by additional noises on the sound signals during the transmission of the sound signals from remotely connected microphones to the terminal unit.

Also, as described above, only a sound signal is transmitted from a microphone to a terminal unit between the terminal unit and the microphone, and thus there is also a problem in that a state of a microphone (ON/OFF, sound volume, directivity, etc.) and the number of microphones connected to a terminal unit are difficult to be grasped at the terminal unit. Furthermore, in addition to the fact that the state of a microphone is rarely grasped at the terminal unit, there is also a problem in that it is necessary to manually operate each microphone itself in order to adjust the sound volume, the adjustment directivity, etc., and thus it takes time and effort for the adjustment.

In general, the number of microphones that can be operated by one power source is fixed. Thus, when microphones are connected in a cascade, if the number of microphones connected is greater than the maximum number of operable units, the entire microphones in the system of that power source become difficult to be operated normally. In such a case, a power source needs to be connected in the middle of the cascade connection. However, it is not easy to determine a power-source system, because the number of microphones that can be connected to one power source changes depending on the length of the cable connecting microphones. Up to now, the setting of such a power-source system is performed manually in consideration of various conditions, and thus troublesome work has been necessary for this setting.

As described above, in a microphone system used in a known conference system, there are problems in that it is difficult to prevent the deterioration of sound quality in the case of multiple-stage connections, and furthermore, the adjustment and settings are necessary to be performed manually, and thus the operationality and the convenience are low.

The present invention has been made in view of these points. It is desirable to provide a microphone system and a microphone apparatus capable of preventing the deterioration of sound quality and improving the operationality and the convenience.

In order to solve the above-described problems, there is provided a microphone system including a main unit for controlling the entire system and microphone apparatuses connected in a cascade, the microphone apparatus including: communication control means for controlling communication connecting the apparatuses in a cascade through a line; sound input means for inputting sound; echo cancellation means for eliminating echo; and sound-information generation means for generating sound information to be transferred toward the main unit, and a microphone system for transmitting data received from the main unit in sequence and the down-most microphone apparatus transmitting response data in sequence toward the main unit in accordance with the cascade connection. Here, it is assumed that the connection direction of the main unit side in a cascade is upstream and the opposite side is downstream. Also, it is assumed that the data transmitted from upstream to a downstream microphone apparatus in sequence is down data, and the data transmitted from downstream to an upstream microphone apparatus in sequence is up data.

The communication control means controls the communication of this up data and down data, transmits the down data received from upstream after predetermined processing, and transmits the up data received from downstream after predetermined processing. The sound input means converts the collected sound into a digital signal and outputs the signal to the echo cancellation means as a sound input signal. The echo cancellation means eliminates an echo component that has been mixed into the sound signal by the sneaking of the sound output to generate a sound signal, and outputs the signal to the sound-information generation means. When the sound-information generation means obtains the up data including the sound information of the downstream microphone apparatuses, the sound-information generation means adds a sound signal of the self-microphone apparatus to the sound information of the downstream microphone apparatus to update the sound information, and upstream transmits the up data including the updated sound information through the communication control means.

According to such a microphone system, each microphone apparatus connected in a cascade from the main unit transmits downstream in sequence the down data received from upstream and transmits upstream the up data received from downstream in sequence, and thus when the main unit transmits the down data, the down data is transmitted from the upstream microphone apparatus near the main unit to the down-most microphone apparatus in the sequence of the connection. When the down data reaches the down-most microphone apparatus, up data is transmitted through each microphone apparatus in the opposite sequence of the down data, and is finally transmitted to the main unit. At this time, in each microphone apparatus, the sound input means converts the collected sound into a digital signal to generate a sound input signal, and the echo cancellation means generates a sound signal produced by eliminating an echo component included in the sound input signal. When the up data is received by the communication control means, the sound-information generation means adds the sound signal of the self-microphone apparatus to the downstream sound information included in the up data to update the sound information. If the self-microphone apparatus is the down-most, the sound information is generated from the sound signal of the self-apparatus. The updated sound information is set in the up data, and is transmitted upstream through the communication control means.

Accordingly, a digital sound signal, which is not deteriorated even if transmitted among microphone apparatuses and is effectively subjected to echo cancellation at each microphone apparatus, is added at each passing of the microphone apparatus, and finally, the sound signal produced by adding the sound signals of all microphone apparatuses is transmitted to the main unit.

According to the present invention, in a microphone system including microphone apparatuses connected in a cascade to the main unit, each microphone apparatus converts collected sound into a digital signal, and performs echo cancellation to generate a sound signal. This sound signal is sent from downstream of the microphone apparatus connected in a cascade to the main unit in sequence. At this time, in each microphone apparatus, processing is performed for adding the sound signal of the self-apparatus to the sound signal received from the downstream microphone apparatus, and thus the main unit finally obtains the sum of the sound signals of all the connected microphone apparatuses.

In this manner, sound signals are converted into digital signals for transmission, and thus the sound signals will not be deteriorated even the signals are transmitted among the microphone apparatuses. Also, each microphone apparatus performs echo cancellation, and thus the echo cancellation can be operated efficiently. As a result, it is possible to transmit sound signal having good quality without deterioration to the main unit even if many microphone apparatuses are connected.

BRIEF DESCRIPTION OF THE DRAWINGS

FIG. 4A illustrates the structure of down data of the present embodiment;

FIG. 4B illustrates the structure of up data of the present embodiment;

DESCRIPTION OF THE PREFERRED EMBODIMENTS

In the following, a description will be given of embodiments of the present invention with reference to the drawings. First, a description will be given of the concept of the invention to be applied to the embodiments. Next, a description will be given of the specific contents of the embodiments.

Figure 1:
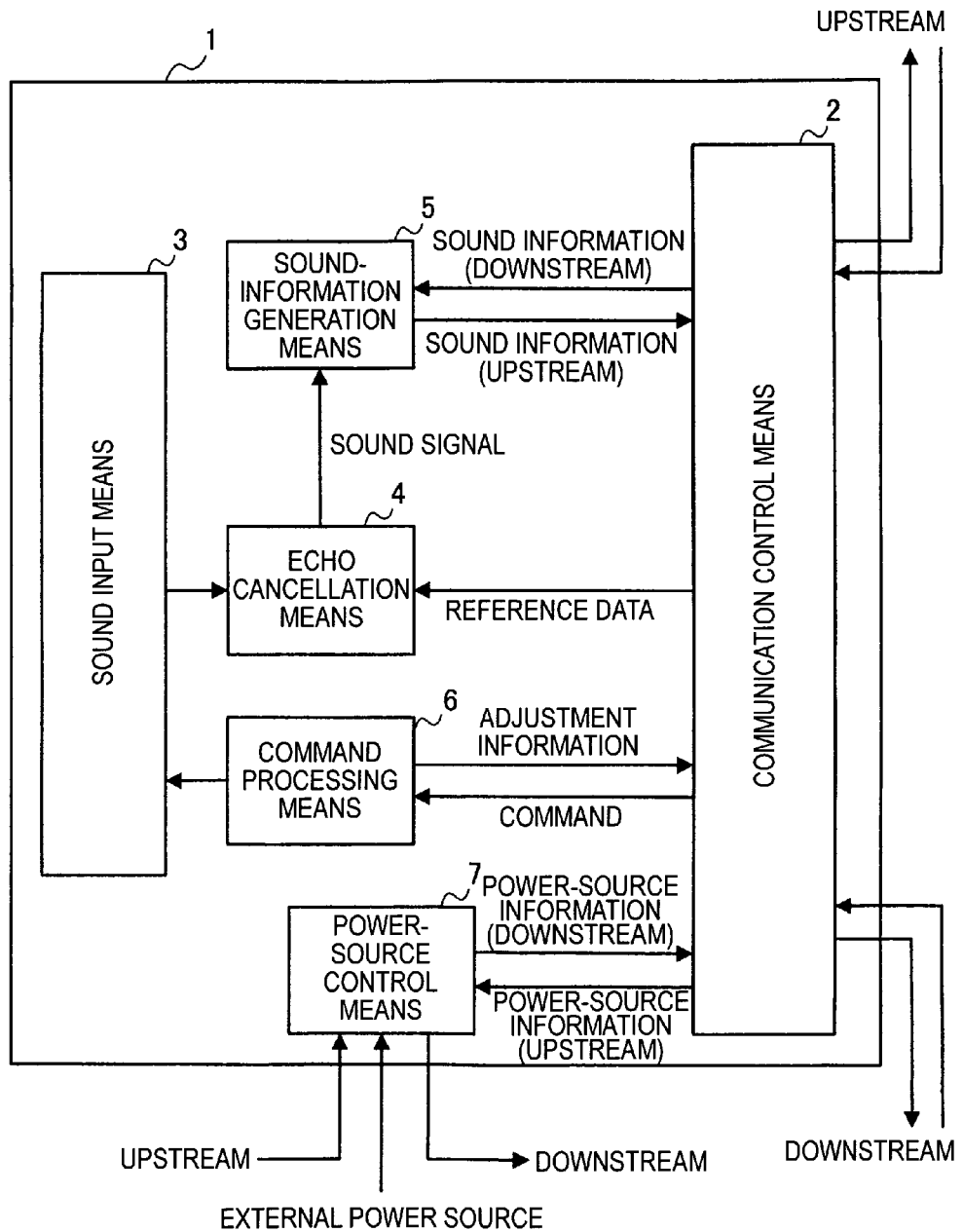
FIG. 1 is a schematic diagram according to an embodiment of the present invention.

FIG. 1 is a schematic diagram according to an embodiment of the present invention.

A microphone 1 is one of microphones connected in a cascade by a communication line and a power cable in a microphone system including an unillustrated main unit and a plurality of microphones connected to the main unit in a cascade. The microphone 1 includes communication control means 2 for controlling communication with the other units, sound input means 3 for inputting sound, echo cancellation means 4 for eliminating echo from a sound-input signal, sound-information generation means 5 for generating sound information to be transmitted to the other units, command processing means 6 for processing a command from the main unit, and power-source control means 7 for controlling power source. In such a microphone system, data output from the main unit is transmitted in sequence among microphones along the cascade connection. When the data reaches the down-most microphone in the connection, data is transmitted in reverse sequence among microphones to reach the main unit.

In the following, in the cascade connection from the main unit by the communication line and the power cable, the direction to the main unit is assumed to be an upstream direction and the opposite direction is assumed to be a downstream direction. Also, data flowing from the main unit toward the downstream microphones in sequence is assumed to be down data, and on the contrary, data flowing from the down-most microphone toward the main unit in reverse sequence is assumed to be up data.

The communication control means 2 controls the transmission and receiving of data such as sound information, device information, number-of-units information, power-source information, adjustment information, reference data, etc., with the upstream microphones or the main unit, and with the downstream microphones if existent. The down data received from upstream microphones or the main unit is subjected to predetermined processing, and then is transmitted to the downstream microphones. On the other hand, the up data received from downstream microphones is subjected to predetermined processing, and then is transmitted to the upstream microphones or the main unit. Also, a device-ID is set for each microphone in order to be identified from the main unit. The device-ID is set based on the device information set in the down data transmitted from the main unit, and is set from an upstream device in sequence. Accordingly, when the microphone 1 obtains down data, the microphone 1 sets the device-ID of the self-microphone based on the device information and transmits down data with the device information value incremented by 1 to the downstream microphone. Thus, a device-ID is set in a microphone in accordance with a connection sequence (transmission sequence of down data). When the communication control means 2 receives down data targeted to a specific microphone, such as a command, the communication control means 2 matches the specified device-ID assigned with the command against the device-ID of the self-microphone to determine whether the self-microphone is the target of the command. Also, the up data includes number-of-units information indicating the number of units of the microphones connected downstream. When up data is received from a downstream microphone, the up data is updated by incrementing the value of number-of-units information by 1, and is transmitted to the upstream microphone. If the self-microphone is the down-most one, an initial value is set in number-of-units information. Thus, the main unit can get the number of microphones to be connected by the value of number-of-units information of the obtained up data.

The sound-input means 3 inputs external sound of the microphone 1, converts the sound signal into a digital signal to output to the echo cancellation means 4. Also, the sound-input means 3 sets mute, sound volume, microphone directivity, etc., to a predetermined state by the command processing means 6 in accordance with an instruction from the main unit.

The echo cancellation means 4 performs elimination processing of a component of the sound-signal (echo) which is returned by the detection of sound and the transmission of the sound signal by that microphone to the other microphones. For example, in the case of a conference system, a sound signal input into the self-microphone is transmitted to another unit, and that sound signal is output to a speaker. The sound output from the speaker is input into a sound signal once again, and thus the sound quality is deteriorated unless that sound signal is eliminated. Thus, for example, the echo cancellation means 4 obtains reference data for echo cancellation and eliminates the echo by subtracting the reference data from the input sound signal. In this regard, reference data can be calculated by predicting a delayed echo component internally.

When the sound-information generation means 5 obtains sound information included in the up data obtained from the downstream microphone through the communication control means 2, the sound-information generation means 5 adds the sound signal of the self-microphone obtained by the echo cancellation means 4. The sound information obtained from the downstream microphone includes the sound signal to which the sound signal of the downstream microphone is added. By adding the sound signal of the self-microphone, the sound signal generated by the downstream microphones from the self-microphone is synthesized. Also, if there is no microphone downstream, sound information is generated by the sound signal of the self-microphone. Furthermore, when adding a sound signal, a determination is made on whether or not the sound signal satisfies the preset condition. Only when the sound signal represents a significant sound satisfying the condition, the sound signal is added to the sound information. For example, it is possible to eliminate surrounding noises, etc., by adding only the sound signal, having a certain level or more, which are recognized as significant sound.

The command processing means 6 performs various processing in accordance with the command obtained through the communication control means 2. The commands indicate instructions from the main unit to the target microphone, and are set in the down data transmitted from the main unit. The commands include a control command for the adjustment of a microphone on a mute, a sound volume, and microphone directivity. The command processing means 6 makes adjustment to set the sound input means 3 to a predetermined state. Also, the command processing means 6 sends adjustment information indicating the current adjustment state in accordance with a read command input through the communication control means 2.

The power-source control means 7 controls the power source of the microphone 1 and controls whether to supply power source to the downstream microphones connected to the microphone 1. In a microphone system, each microphone receives the supply of power from the main unit or the external power source through the upstream microphone. Here, the upstream microphone and the downstream microphone are the same as the upstream microphone and the downstream microphone of the communication control means 2. The power-source control means 7 constitutes a power-source system by supplying the power from the upstream microphone to the downstream microphone in sequence. However, the number of units to which one power source can supply power is limited, and when the number of units exceeds the limit, an external power source is connected. The power-source control means 7 also includes external detection means for detecting whether an external power source is connected or not. The power-source control means 7 adds power-source information indicating what number the microphone is connected from a predetermined power source, and performs power-source control by transmitting this power-source information in sequence. That is to say, the power-source control means 7 knows what number from the power source the self-microphone is connected based on the power-source information of the down data from the upstream and determines whether or not a maximum number of connection units to one power source has been reached. If the number of units has not reached the maximum number of connection units by the self-microphone, it is determined that more microphones can be connected, and thus power is supplied to the downstream microphone. The value of the power-source information is increased to update the down data, and the data is transmitted to the downstream microphone through the communication control means 2. The increasing value of the power-source information is determined depending on the length of the cable. The number of microphones to which a predetermined power source can supply power is determined by the length of the power cable. The longer power cable becomes, the lower the number of units becomes. Accordingly, when the power cable is long, the value of the power source is increased by a higher value than usual in order to make the number of units to which power is supplied lower. If the number of microphones has reached the maximum number of connection units by the self-microphone, power is not supplied to the downstream microphone. However, an external power source is sometimes connected to the downstream microphone to make the microphone operable without supplying power, and thus the downstream data is transmitted. On the other hand, if an external power source is connected to the self-microphone, it is possible to supply power from the self-microphone to the maximum number of connection units. Thus the power is supplied to the downstream microphone, the value of the power-source information is initialized to update the down data, and the data is transmitted to the downstream microphone through the communication control means 2. The details of the power-source control will be described below.

A description will be given of the operation of the microphone system having the above configuration.

A plurality of microphones having the same configuration as the microphone 1 shown in the figure are connected in a cascade by communication lines and power cables, and are connected to the main unit which controls the entire system.

The main unit transmits down data toward a group of microphones connected in a cascade at predetermined timing. The down data includes device information, power-source information, a command and a specified device-ID specifying the target microphone if there is an instruction from the main unit, and reference data for echo cancellation if necessary.

When the microphone 1 receives down data by the communication control means 2, the microphone 1 performs predetermined processing to transmit updated down data to the downstream microphone. First, the microphone 1 sets the device-ID of the self-microphone based on the device information included in the down data, and increases the value of the device information to update the down data. When a command is set in the down data, if the specified device-ID and the device-ID of the self-microphone match, the command processing means 6 performs the corresponding processing to that command. If reference data is set in the down data, the down data is transmitted to the echo cancellation means 4, and the echo cancellation means 4 uses this reference data in the subsequent echo processing. Furthermore, the power-source control means 7 determines whether the downstream microphone can be connected to that power source depending on whether the power-source connection has been reached to the maximum number of connection units by the connection of the self-microphone based on the power-source information indicating the number of microphones connected to the upstream power source. If possible, the power is supplied, and the updated down data with an increase of the power-source information is transmitted to the downstream microphone. If not possible, the power is not supplied to the downstream microphone. Also, if the self-microphone is connected to an external power source, the power is supplied to the downstream microphone, and the power-source information is updated by the initialization. In this manner, the down data with the updated device information and the power-source information is transmitted to the downstream microphone after the completion of the series of processing.

On the other hand, each microphone inputs the surrounding sound by the sound input means 3, and converts the sound into a digital signal to produce a sound input signal in addition to the down data processing. The sound input signal is changed into a sound signal by eliminating an echo component by the echo cancellation means 4 to be transmitted to the sound-information generation means 5.

As described above, each microphone performs sound-signal processing and performs data processing in accordance with the down data output from the main unit to be transmitted in sequence.

In this manner, when the down data reaches the down-most microphone connected in a cascade, the down-most microphone creates up data and transmits the data toward the main unit. In the up data, sound information, number-of-units information, response data to a command, etc., are set if necessary. If the self-microphone is the down-most microphone 1, the sound-information generation means 5 generates sound information based on the sound signal of the echo cancellation means 4. In this regard, only in the case that the sound signal is significant, the sound signal is reflected on the sound information. Furthermore, an initial value of the number-of-units information, and response data to a command if necessary are set in the up data. Also, if the microphone 1 is in the middle of a connection, when the microphone 1 receives up data from the downstream microphone, if the sound signal of the self-microphone is significant, the sound-information generation means 5 adds the sound signal of the self-microphone to the sound information included in the up data to update the sound information. Furthermore, the sound-information generation means 5 increases the value of the number-of-units information to update the information, and sets the response data to the command if necessary.

In this manner, the up data to which the microphone information is added is transmitted to upstream after the completion of a series of processing, and the main unit finally receives the up data. The sound signal converted into digital by each microphone is not deteriorated even if the signal is transmitted through many microphones. Also, echo cancellation processing can be operated effectively, because the processing is performed by each microphone. As a result, the main unit can obtain sound signal having good quality without deterioration even if many microphones are connected. Also, when the main unit gives an instruction to each microphone using a command, each microphone performs automatic processing of that command, and thus there is an advantage in that the control of the entire microphone system becomes easy. Furthermore, a microphone automatically performs the control of supplying power-source, and thus there is an advantage in that the power-source control becomes easy.

Figure 2:
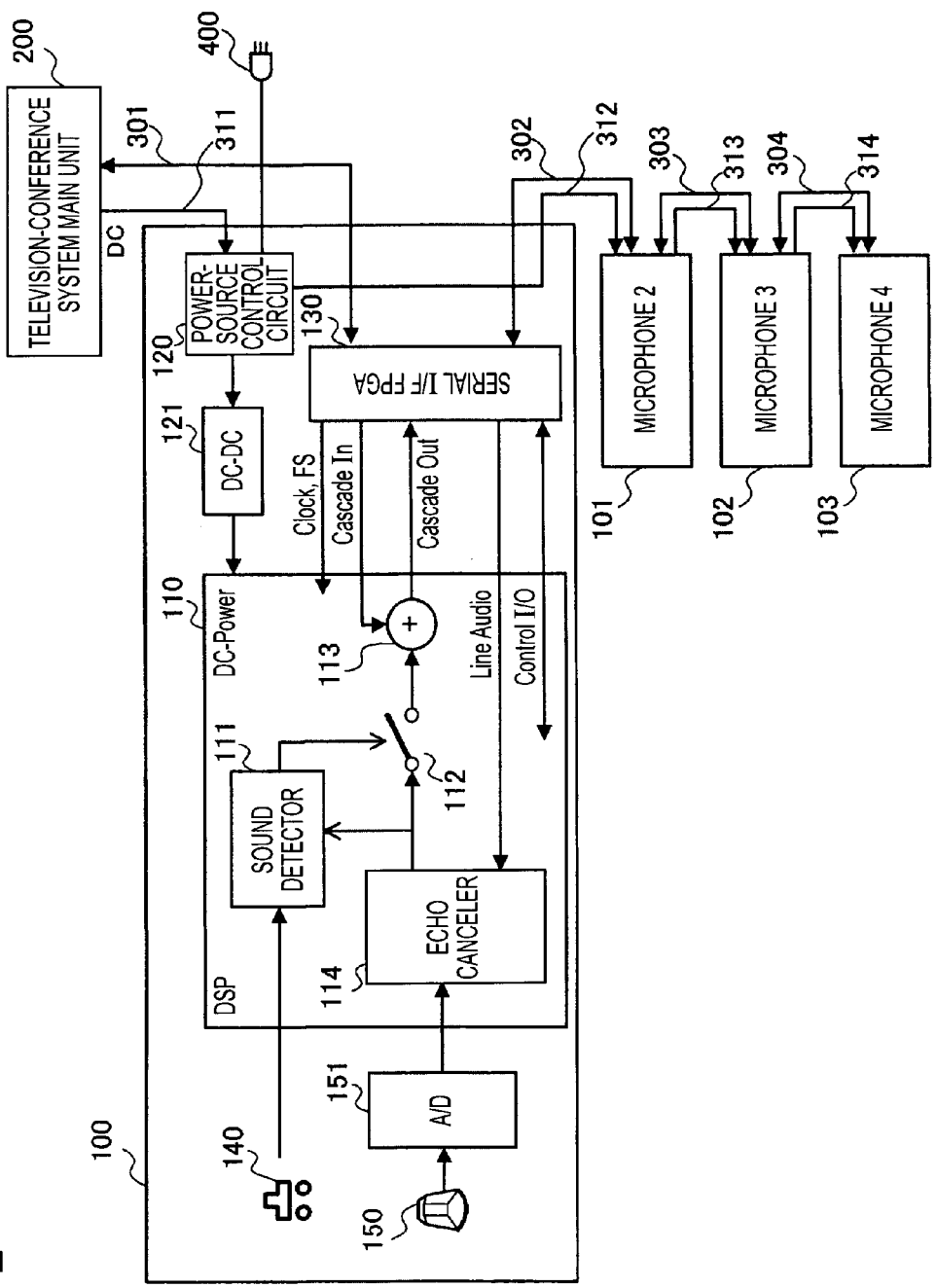
FIG. 2 is a configuration diagram of a microphone system applied to a television conference system according to the embodiment.

In the following, a detailed description will be given of an example of the sound processing of a television conference system according to an embodiment with reference to the drawings. FIG. 2 is a configuration diagram of a microphone system applied to a television conference system according to the embodiment.

The television conference system according to the embodiment includes a television-conference-system main unit (in the following, referred to as the main unit) 200. Also, the system includes a microphone 1 (100), a microphone 2 (101), a microphone 3 (102), and a microphone 4 (103), which are connected in a cascade to the main unit through communication paths 301, 302, 303, and 304, and power-source signal lines 311, 312, 313, and 314. Each microphone has the same configuration, and thus a description will be given of the case of the microphone 1 (100) below.

The microphone 1 (100) includes a DSP (Digital Signal Processor) 110 for performing sound processing, a power-source control circuit 120 and a DC-DC converter 121 which perform power-source processing, a serial I/F FPGA (Field Programmable Gate Array) 130 for controlling serial communication, an ON/OFF switch 140 of the microphone, and a sound collection part 150 and an A/D converter 151 for inputting sound. In the following, the serial I/F FPGA 130 is denoted by a serial I/F 130.

The DSP 110 constitutes the echo cancellation means 4 and sound-information generation means 5, and includes a sound detector 111, a selection switch 112, an adder 113, and an echo canceler 114. The sound detector 111 detects the state of the ON/OFF switch 140, and operates the selection switch 112 depending on the state. That is to say, if the ON/OFF switch is ON, the selection switch 112 is connected, and the input signal from the sound collection part 150 is output to the adder 113. Also, if the ON/OFF switch is OFF, the selection switch 112 is operated to separate the input from the sound collection part 150. The adder 113 adds the sound information (Cascade In) of the other microphones connected in a cascade, which is input from the serial I/F 130 and the sound signal of the self-microphone input through the selection switch 112, and transmits the signal through the serial I/F 130 (Cascade Out). The echo canceler 114 obtains information (Line Audio), which is obtained from the main unit 200, on the sound (echo) returned after the sound transmitted by that self-microphone is sent to the other party, and eliminates the echo based on this. Also, an unillustrated controller inputs a control instruction through the serial I/F 130, and performs the processing in accordance with the instruction (Control I/O). In this regard, the DSP 110 generates an operation clock in accordance with the down data input through the serial I/F 130.

The power-source control circuit 120 sends DC power supplied from the upstream main unit 200 to the DC-DC converter 121, and determines whether or not to supply power downstream. If the power is supplied, the power-source control circuit 120 performs control to supply power to the microphone 2 (101) through the power-source signal lines 312. At this time, the power-source control circuit 120 determines whether to supply power downstream in consideration that an external DC power source 400 is connected to the self-microphone, the length of the power cable connected downstream, etc.

The serial I/F 130 inputs the down data transmitted from the main unit 200, performs predetermined processing, and outputs the down data to the downstream microphone 2 (101). Also, the serial I/F 130 performs processing, such as adding the sound signal of the self-microphone to the sound information on the up data input from the downstream microphone 2 (101), and then outputs the up data to the upstream main unit 200. In the following, the down data and the up data to be communicated are generically called a communication command.

The ON/OFF switch 140 is an external switch for operating ON/OFF of the microphone 1 (100).

The sound collection part 150 receives the input of external sound and sends a signal to an A/D converter 151. The A/D converter 151 converts the analog sound signal generated by the sound collection part 150 into a digital signal to output to the echo canceler 114.

The main unit 200 exchanges information with the microphone 1 (100), the microphone 2 (101), the microphone 3 (102), and the microphone 4 (103) through a communication command, and controls these microphones.

The external DC power source 400 is connected to each microphone depending on the situation in order to supply power.

A description will be given of the operation of the television conference system having the above-described configuration. Here, the operations of the microphone and the microphone system will be described as the center of the sound processing by the DSP 110.

The sound collection part 150 receives the input of the surrounding sound and generates an analog signal in accordance with the sound to output the signal to the A/D converter 151. The A/D converter 151 converts the analog signal generated in accordance with the sound into a digital signal to output to the DSP 110 as a sound input signal. On the other hand, the ON/OFF switch 140, which makes it possible to select ON or OFF of the microphone function, is arbitrary turned ON/OFF depending on the use state of a user's microphone. The state of the ON/OFF switch 140 can be read from the DSP 110.

In the DSP 110, an echo component is eliminated from the sound input signal input from the A/D converter 151 to produce a sound signal using the reference data that is obtained by the echo canceler 114 through the serial I/F 130. This sound signal is output to the adder 113 through the selection switch 112. The sound detector 111 detects the state of the ON/OFF switch 140. If the state is ON, the selection switch 112 is changed into a connection state to output the sound signal generated by the echo canceler 114 to the adder 113. On the other hand, if the state is OFF, the selection switch 112 is separated and the sound signal is not output to the adder 113. Also, the adder 113 adds the sound signal input through the selection switch 112 and the sound signal of the downstream microphone input through the serial I/F 130 (Cascade In) to output the signal (Cascade Out).

In this manner, in the DSP 110, if the ON/OFF switch 140 is ON, the sound signal, subjected to echo cancellation, detected by the self-microphone (microphone 1 (100)) is added to the sound information from the downstream to be transmitted upstream. On the other hand, if the ON/OFF switch 140 is OFF, the sound signal of the self-microphone is not added and is transmitted upstream. Accordingly, only if the ON/OFF switch 140 is ON, the main unit 200 can obtain the sound signal of the microphone 1. The sound signals are converted into digital signals, and thus when the addition processing of the sound signal is performed by the DSP 110 with a plurality of microphones, the sound quality signal will not be deteriorated. Furthermore, the echo cancellation is performed at each microphone by the echo canceler 114, and thus it is possible to perform the echo cancellation more efficiently and more effectively compared with the echo cancellation performed by the main unit that has obtained the sound signals of all the microphones. As a result, it is possible to obtain a sound signal with good quality in the main unit 200 even in the case that many microphones are connected.

Figure 3:
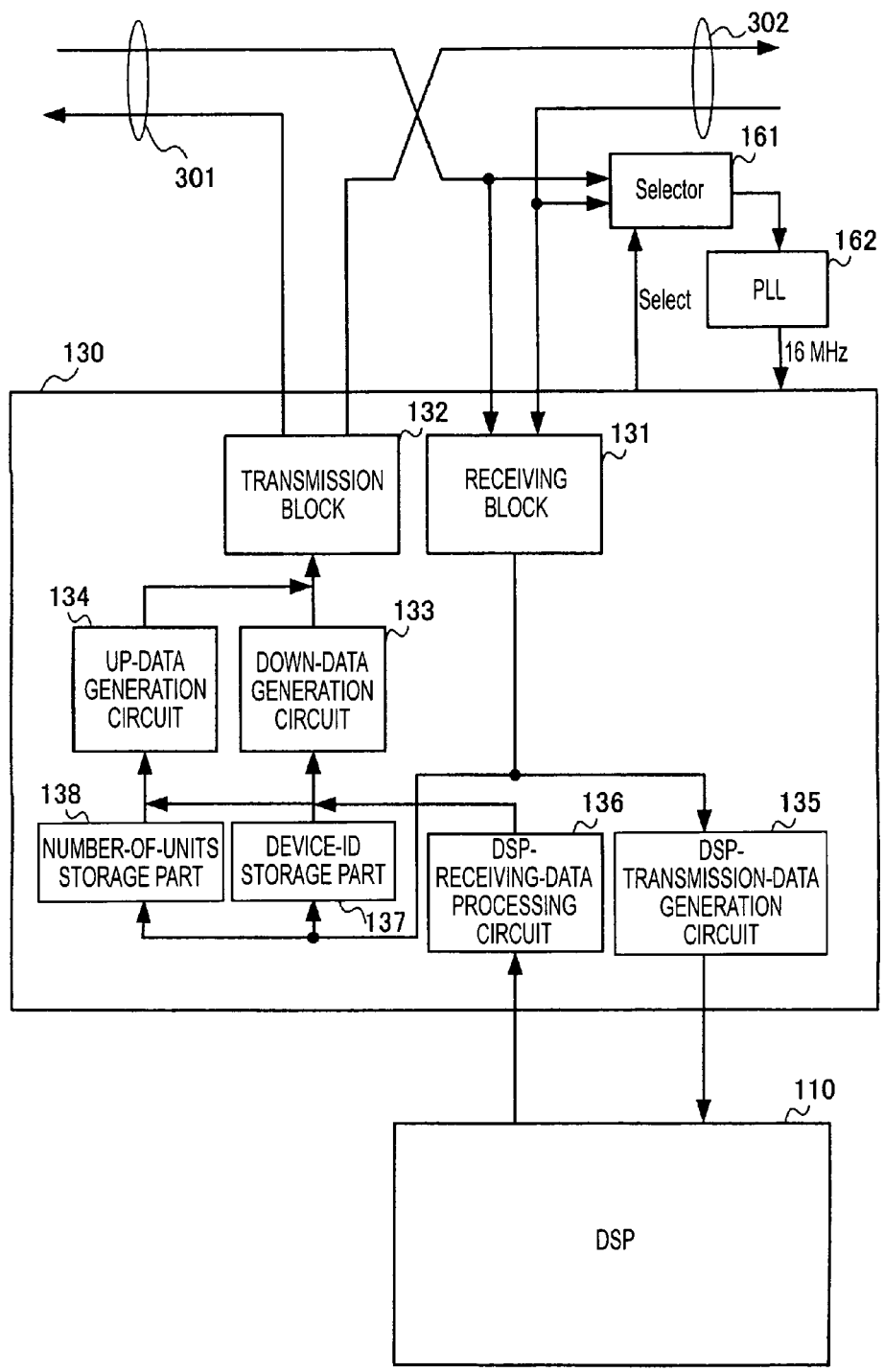
FIG. 3 is a block diagram illustrating the configuration of a communication interface according to the embodiment of the present invention.

Next, a detailed description will be given of the serial I/F 130 which performs communication control of the sound information (sound signal) generated by the above-described procedure, the device information, the power-source information, control commands, etc. FIG. 3 is a block diagram illustrating the configuration of a communication interface according to an embodiment of the present invention. The same parts as those in FIG. 2 are marked with the same numerals and the descriptions thereof are omitted.

The serial I/F 130 is connected to an upstream apparatus (a microphone or the main unit) through the communication path 301, and is connected to downstream microphones through the communication path 302. The serial I/F 130 includes a receiving block 131 for receiving a communication command, a transmission block 132 for transmitting a communication command, a down-data generation circuit 133 for generating down data based on a communication command, an up-data generation circuit 134 for generating up data, a DSP-transmission-data generation circuit 135 for generating data to be transmitted to the DSP 110, a DSP-receiving-data processing circuit 136 for processing data obtained from the DSP 110, a device-id storage part 137 for storing the device information of down data, and a number-of-units storage part 138 for storing number-of-units information of up data. Also, a selector 161 for selecting the receiving signal and a PLL circuit 162 for generating clock are connected to the serial I/F 130.

The receiving block 131 receives the down data input from upstream through the communication path 301 and the up data input from downstream through the communication path 302, and sends the data to the DSP-transmission-data generation circuit 135. Also, the value of the device information included in the down data is increased by 1. The down data is stored in the device-id storage part 137 and is transferred to the down-data generation circuit 133. Also, the value of the number-of-units information included in the up data is increased by 1. The up data is stored in the number-of-units storage part 138 and is transferred to the up-data generation circuit 134.

The transmission block 132 transmits the up data upstream through the communication path 301 and the down data downstream through the communication path 302. The up data is created by the up-data generation circuit 134 and the down data is created by the down-data generation circuit 133. In this regard, a transmission/receiving clock is generated by the selector 161 and the PLL circuit 162. The selector 161 selects the receiving signal of the down data transmitted from upstream in accordance with the control signal (Select) by unillustrated control means, and a clock is generated in accordance with the down data received by the PLL circuit 162.

The DSP-transmission-data generation circuit 135 generates DSP transmission data to be output to the DSP 110 based on the communication command obtained from the receiving block 131, and outputs the data to the DSP 110. For example, a control command for instructing the operation of the DSP 110, reference data for echo cancellation, etc., are sent to the DSP 110 by the down data, and the sound information of the other microphones, etc., are sent to the DSP 110 by the up data.

The DSP-receiving-data processing circuit 136 processes data obtained from the DSP 110, and outputs to the up-data generation circuit 134 or the down-data generation circuit 133. For example, the sound information to which the sound signal of the self-microphone obtained from the DSP 110, a response to a control command, etc., are output to the up-data generation circuit 134.

The down-data generation circuit 133 updates the device-information of the down data transferred from the receiving block 131 to the device-ID (value of the received device-ID increased by 1) of the device-id storage part 137, sets the power-source information set by the power-source control circuit 120 in the down data, and generates the down data to be transmitted downstream through the communication path 302.

The up-data generation circuit 134 updates the number-of-units information of the up data transferred from the receiving block 131 to the number of units in the number-of-units storage part 138 (value of the received number of units increased by 1), sets the sound information and the response data of the DSP 110 obtained from the DSP-receiving-data processing circuit 136, and generates the up data to be transmitted upstream through the communication path 301.

A description will be given of the operation of the serial I/F 130 having such a configuration.

The communication is started by the receiving from the upstream side. When a down data signal is input from upstream through the communication path 301, the PLL circuit 162 generates a transmission/receiving clock by the selector 161 based on the input signal. The receiving block 131 receives the down data signal input in accordance with the transmission/receiving clock. At this time, the transmission block 132 starts the upstream transmission processing of the up data generated by the up-data generation circuit 134 through the communication path 301. The communication path 301 is provided with two signal lines, by which transmission and receiving are individually performed at the same time.

When the receiving block 131 receives the entire down data, the receiving block 131 checks whether the down data is normal or not, and then transfers the down data to the DSP-transmission-data generation circuit 135, the down-data generation circuit 133, and the power-source control circuit 120. At this time, the device-ID is stored in the device-id storage part 137.

When the down-data generation circuit 133 generates the down data, the transmission block 132 transmits the down data downstream through the communication path 302. At this time, the downstream microphones perform the above-described processing, and thus the receiving block 131 receives the up data transmitted by the downstream microphones through the communication path 302. When the receiving block 131 obtains the entire up data from downstream, the receiving block 131 checks whether the up data is normal or not, and then transfers the up data to the DSP-transmission-data generation circuit 135 and the up-data generation circuit 134. At this time, the receiving block 131 adds 1 to the value of the number-of-units information that has been read, and stores the value in the number-of-units storage part 138. The up-data generation circuit 134 sets the up data, and waits for the transmission timing of the up data (receiving of the down data) by the transmission block 132.

By the above processing procedure, data transmission among microphones is controlled. In this regard, in the case of the down-most microphone, the downstream transmission of the down data is not performed.

Next, a description will be given of the flow of the up data and the down data processed by the serial I/F 130. FIGS. 4A and 4B illustrate the structures of down data and up data of the present embodiment.

The down data includes a power-source information part (PowId) 401, a device-information part (TermID) 402, a specified-device-ID part (Dest) 403, a control-command part (CMD) 404, a reference-data part (Line Audio) 405, a DSP code part (DSP Boot Code) 406, a CRC 407, and a synchronization-signal part (Sync) 408.

The power-source information part (PowId) 401 indicates the number of microphones connected to the upstream power source. The power-source control part reads the value of the power-source information part 401 and uses it to determine whether the power can be supplied downstream. If the power can be supplied, the power is supplied and the value of the power-source information part 401 is increased in accordance with the length of the power cable. For example, if the length of the cable is 2 meters, the number is increased by 1, and if it is 8 meter, the number is increased by 4. This is the processing for restricting the number of connection units in the case of a long cable. Also, in the microphone to which the main unit or an external power source is connected, it is assumed that 0 is transferred from upstream. The device-information part (TermID) 402 shows what number the device is from the main unit and becomes the device-ID of this microphone. The value transferred from upstream is increased by 1 and is transferred to downstream. However, at the main unit, 0 is assumed to be transferred from upstream. The specified-device-ID part (Dest) 403 specifies a device-ID (TermID) for which the next control command (CMD) is to be executed. In this regard, it is possible to cause all the devices to execute a control command all at once by specifying a particular device-ID (for example, 0xff, etc.). The control-command part (CMD) 404 indicates an instruction to be executed by a microphone. Processing is determined in advance, for example, 1 indicates the reading of a DSP program, 2 indicates the reading of a microphone status, and 3 indicates the reading of a level, etc. In the reference-data part (Line Audio) 405, a reference signal for echo cancellation is set. In the DSP code part (DSP) 406, a code specifying the operation of the DSP part is set. In the CRC 407, a CRC of each data is stored and used for CRC checking. In synchronization-signal part (Sync) 408, a signal for synchronization is set.

On the other hand, the up data includes a number-of-units information part (MaxTerm) 411, a response-device information part (SrcID) 412, a status-ID part (StsId) 413, a sound-information part (MixedMic Audio) 414, a status part (Status) 415, a CRC 416, and a synchronization-signal part (Sync) 417.

The number-of-units information part (MaxTerm) 411 indicates the number of microphones connected to the downstream. The value transferred from downstream is increased by 1 and is transferred upstream. In the response-device information part (SrcID) 412, a microphone device-ID for which the specified control command (CMD) is processed and a status-ID and a status have written values is set. In status-ID part (StsId) 413, a processing result for the command is written together with the status part (Status) 415. The sound-information part (MixedMic Audio) 414 is the sound signal produced by mixing the downstream sound signals, and is transferred by further adding the sound signal collected by the self-microphone. The CRC 416 and the synchronization-signal part (Sync) 417 are the same as those of the down data.

A description will be given of the data processing of the serial I/F 130 which performs the communication processing of such down data and up data.

In the microphone system according to the present embodiment, when the down data is transmitted from the main unit 200, the communication processing of each microphone is started in sequence.

Down data is input into the receiving block 131 through the communication path 301 connected upstream. At this time, a receiving signal is selected by the selector 161 to be input into the PLL 162, and the transmission/receiving clock is generated. The receiving block 131 adds 1 to the device-ID stored in the device-information part (TermID) 402 of the down data, stores that into the device-id storage part 137, and sends the down data to the down-data generation circuit 133. Also, the power-source information part 401 of the down data is transferred to the power-source control circuit 120. The specified-device-ID part 403, the control-command part 404, the reference-data part 405, and the DSP code part 406 are sent to the DSP-transmission-data generation circuit 135.

Of the down data received by the receiving block 131, the down-data generation circuit 133 updates the device-information part (TermID) 402 to the value of the device-ID stored in the device-id storage part 137. Thus, the device-information part 402 of the device-ID from the down data obtained increased by 1 is set. Also, the down-data generation circuit 133 updates the power-source information part (PowId) 401 based on the power source information obtained from the power-source control circuit 120. In this manner, the down data with the updated power-source information part (PowId) 401 and device-information part (TermID) 402 is sent to the transmission block 132. The transmission block 132 transmits the down data created by the down-data generation circuit 133 to the downstream microphones through the communication path 302.

At the same time, the DSP 110 that has obtained the down data through the DSP-transmission-data generation circuit 135 performs the processing in accordance with the instruction from the main unit. For example, adjustments such as the setting of a sound level, a mute, etc., are performed in addition to the reading of various statuses. In the case of reading, etc., a response is returned from the DSP 110 and is input into the DSP-receiving-data processing circuit 136. The DSP-receiving-data processing circuit 136 transmits the response to the up-data generation circuit 134.

Next, the receiving block 131 inputs up data through the communication path 302 connected downstream. The receiving block 131 adds 1 to the value of the number-of-units information part (MaxTerm) 411 of the up data, stores the value into the number-of-units storage part 138, and transfers the up data to the up-data generation circuit 134 and the DSP-transmission-data generation circuit 135. The DSP-transmission-data generation circuit 135 sends the data of the downstream sound-information part (MixedMic Audio) 414 to the DSP 110. The DSP-receiving-data processing circuit 136 obtains sound information to which the sound information of the self-microphone is added from the DSP 110, and transmits the information to the up-data generation circuit 134.

The up-data generation circuit 134 sets the value of the number-of-units storage part 138 in the number-of-units information part (MaxTerm) 411 of the up data to be transmitted upstream, and sets the sound information obtained from the DSP-receiving-data processing circuit 136 in the sound-information part (MixedMic Audio) 414. Also, if the up-data generation circuit 134 has received the response of a control command from the DSP-receiving-data processing circuit 136, the up-data generation circuit 134 sets the response-device information part (SrcID) 412, the status-ID part (StsId) 413, and the status part (Status) 415 in accordance with the response. The up data generated in this manner is transmitted upstream by the transmission block 132 at predetermined timing.

Next, a description will be given of the power-source control.

The power-source control circuit 120 includes external power-source detection means which detects whether an external DC power source is connected to the self-microphone, and power-cable-length detection means which detects whether or not the length of a power cable is longer. This is because when an external DC power source is connected, the number of downstream microphones that can supply power is increased, and if the length of the power cable is longer than a predetermined length, the number of downstream microphones that can supply power is decreased.

Figure 5A:
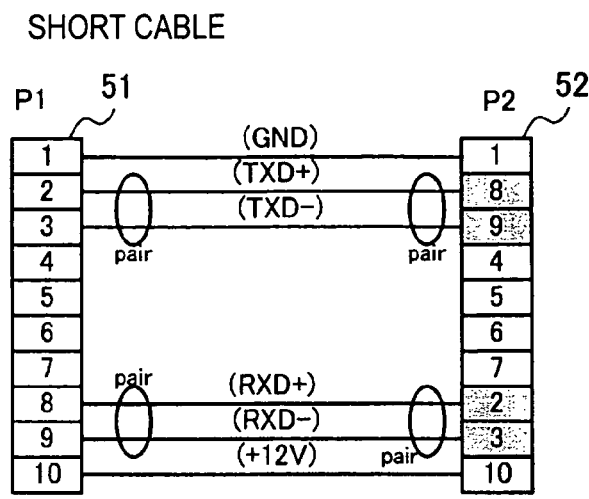
FIG. 5A is a diagram illustrating a power cable of the present embodiment.
Figure 5B:
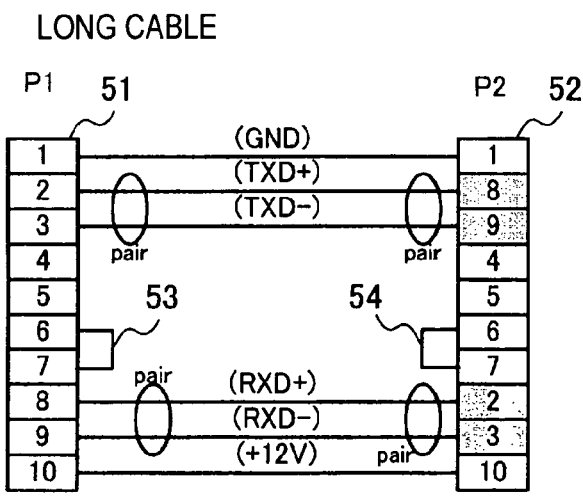
FIG. 5B is a diagram illustrating a power cable of the present embodiment.

Here, a description will be given of an example of the power-cable-length detection means. FIGS. 5A and 5B are diagrams illustrating a power cable of the present embodiment. FIG. 5A illustrates the case of a short cable and FIG. 5B illustrates the case of a long cable.

In the power cables shown in the figures, a pin 1 (P1) 51 connected to the self-microphone and a pin 2 (P2) 52 connected to the upstream or down stream microphone of the pin 1 (P1) 51 are connected by a plurality of signal lines. In this regard, the pin 1 (P1) 51 may be connected to the upstream or down stream microphone and pin 2 (P2) 52 may be connected to the self-microphone.

As is apparent from the figures, in the case of a short cable, FIG. 5A, the pin numbers 6 and 7 of the pin 1 (51) and the pin 2 (52) are empty. On the other hand, in the case of a long cable, FIG. 5B, the pin numbers 6 and 7 of the pin 1 (51) and the pin 2 (52) are connected internally by the signal lines 53 and 54. Accordingly, by checking the states of pin numbers 6 and 7, it is possible to determine whether a cable is a short cable having a shorter length than a predetermined length or a long cable. In this regard, the connections may be made only at the short cable side.

Next, a description will be given of the power-source control processing by the power-source control circuit 120.

In the following description, it is assumed that in a microphone system, when connections are made with only short cables, the maximum number of connection units is 8, whereas if one long cable is inserted in a connection, the maximum number of connection units is reduced by 4. In this regard, the main unit can have several power-source systems and one power-source system is assumed to correspond to one power source.

The number of microphones connected to one power source is controlled using the power-source information of down data. When each microphone obtains the power-source information of down data, 1 is added in the case that the cable connecting the self-microphone is a short cable, and 4 is added in the case that the cable connecting the self-microphone is a long cable (When power is supplied to the self-microphone, 1 is added for the self-microphone and thus the result is 5). Thus, the power-source information is updated and the down data is transmitted to downstream microphones. Also, the initial value 0 is set in the case that an external DC power source is connected and for the power-source information transmitted from the main unit. In this manner, by changing an additional value in accordance with the length of a power cable, it becomes possible to change the maximum number of connection units and to which power is supplied from one power source as a result.

In the following, a description will be given with a specific example.

Figure 6:
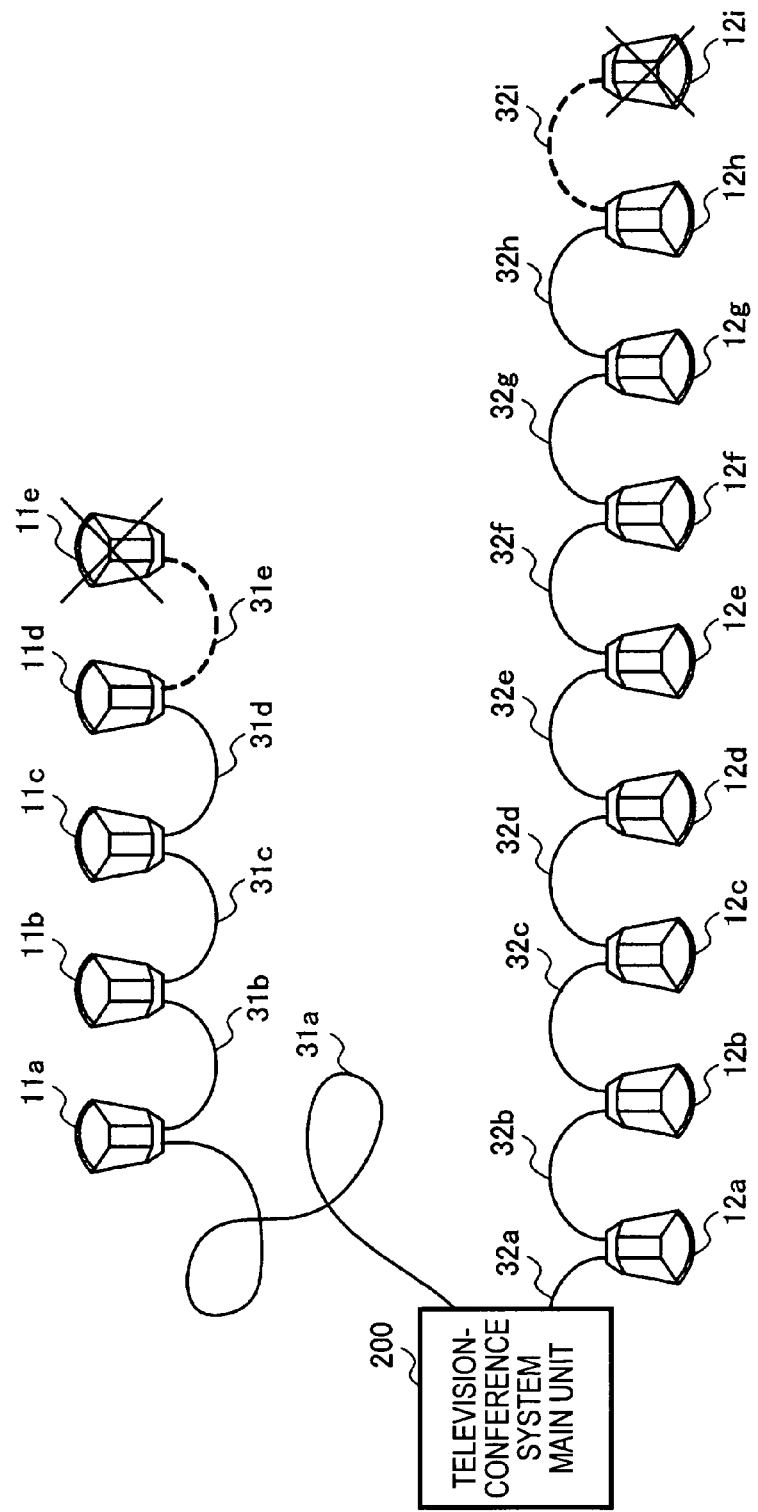
FIG. 6 is a configuration diagram of a first example of a microphone system to which power-source control of the present embodiment is applied.

FIG. 6 is a configuration diagram of a first example of a microphone system to which power-source control of the present embodiment is applied. The first example is an example of the configuration without connections to external DC power sources.

The television-conference-system main unit 200 for supplying power has two power-source systems, each of which can connect up to 8 units in the case of a short cable connection.

In the first power-source system, a microphone 11a is connected by a long cable 31a, and subsequent microphones 11b, 11c, 11d, and 11e are connected by short cables 31b, 31c, 31d, and 31e, respectively, which results in 5 units in total.

Referring to the up-most microphone 11a, the long cable 31a is connected to the microphone 11a, and the power-cable-length detection means detects that a long cable is connected. When the microphone 11a receives down data transmitted from the main unit 200, the microphone 11a adds an additional value in accordance with the cable length, because an initial value (0) is set in the power-source information part. In this case, power is supplied by a long cable, and thus 5 is added. A comparison is made with the maximum number of connection units (8). Since the maximum number of connection units is not exceeded, power is supplied to the subsequent microphone 11b, and the microphone 11a transmits the down data with the value of the power-source information updated to 5, to the microphone 11b. In the next microphone 11b, 5 is set in the power-source information of the down data, and thus an additional value (1, because of a short cable) is added in accordance with the cable length to change the value to 6. A comparison is made with the maximum number of connection units (8). Since the maximum number of connection units has not been reached, power is supplied to the subsequent microphone 11c, and the microphone 11a transmits the down data with the value of the power-source information updated to 6, to the microphone 11c. In this manner, processing is performed in sequence, and thus the microphone 11c and the microphone 11d receive the down data including the power-source information of 6 and 7, respectively. When the microphone 11d adds an additional value (1) in accordance with the cable length, the result becomes 8, and thus the maximum number of connection units (8) has been reached. Therefore, the power supply to the next microphone 11e is stopped. Accordingly, the microphones 11a, 11b, 11c, and 11d receive power supply and operate.

On the other hand, the second power-source system is constructed all by short cables. Microphones 12a, 12b, 12c, 12d, 12e, 12f, 12g, 12h, and 12i are connected by short cables 32a, 32b, 32c, 32d, 32e, 32f, 32g, 32h, and 32i. In this case, for the power-source information of the down data, the microphone 12a receives 0, the microphone 12b receives 1, the microphone 12c receives 2, the microphone 12d receives 3, the microphone 12e receives 4, the microphone 12f receives 5, the microphone 12g receives 6, and the microphone 12h receives 7. When the microphone 12h adds an additional value (1) in accordance with the cable length, the result reaches the maximum number of units connected (8). Thus, the supplying power to the next microphone 12i is stopped. Accordingly, the power is supplied to 8 units from the microphone 12a to the microphone 12h to be operated.

Figure 7:
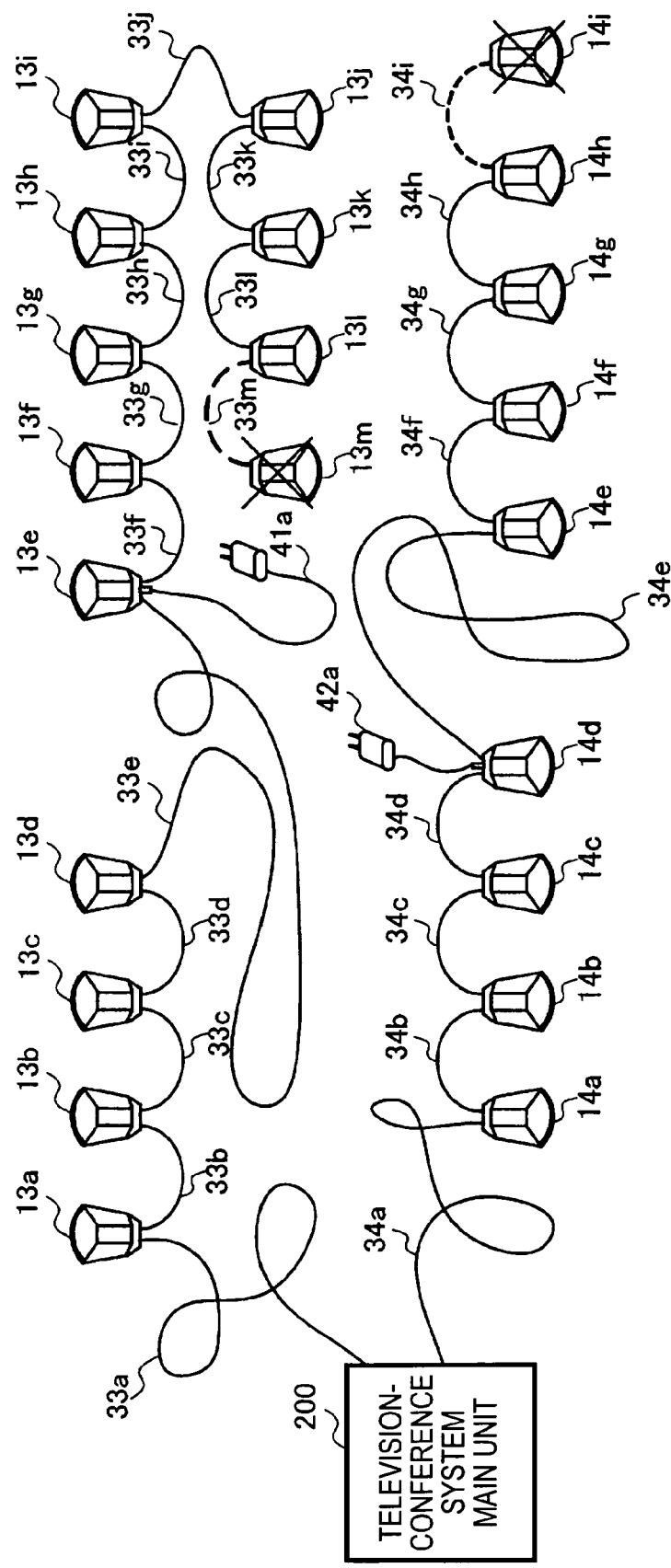
FIG. 7 is a configuration diagram of a second example of a microphone system to which power-source control of the present embodiment is applied.
Figure 8:
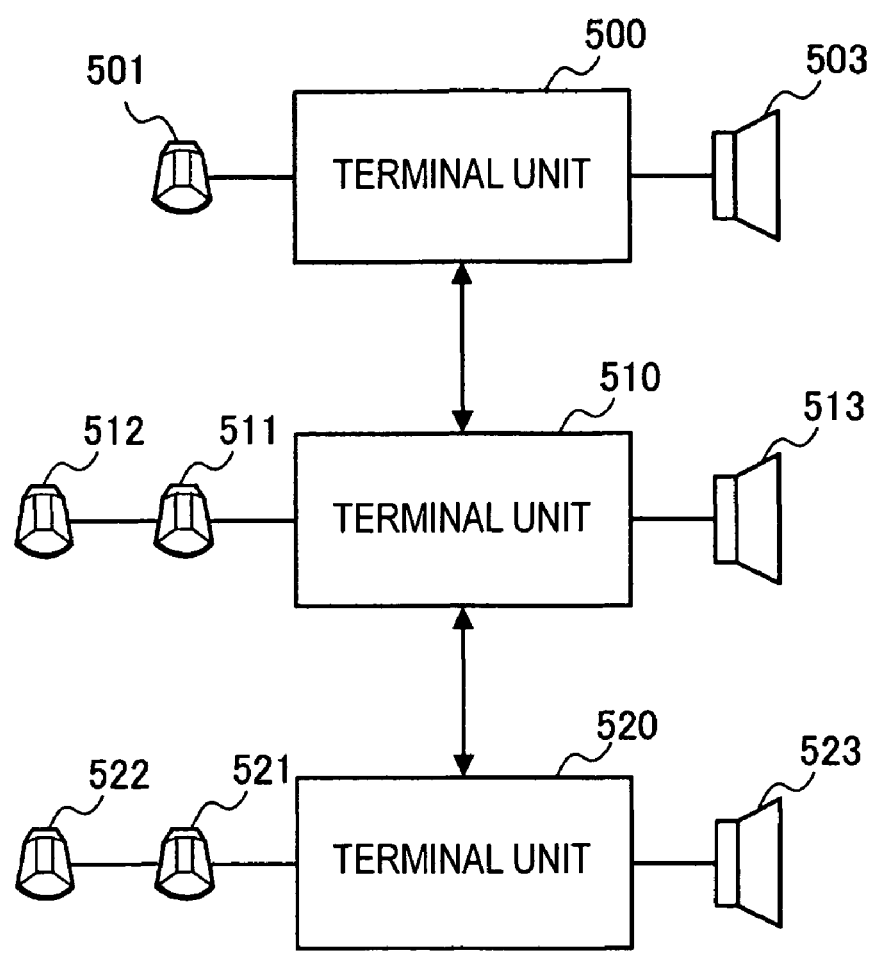
FIG. 8 is a configuration diagram illustrating an example of a known conference system among many places.

FIG. 7 is a configuration diagram of a second example of a microphone system to which power-source control of the present embodiment is applied. The second example is an example of the configuration with connections to external DC power sources furthermore.

In the first power-source system, microphones 13a, 13b, 13c, 13d, 13e, 13f, 13g, 13h, 13i, 13j, 13k, 13l, and 13m are connected by long cables 33a and 33e, and short cables 33b, 33c, 33d, 33f, 33g, 33h, 33i, 33j, 33k, 33l, and 33m. Also, an external DC power source 41a is connected to the microphone 13e. In this case, the microphones 13a and 13e detect that a long cable is connected, and thus 5 is added to the value of the power-source information. Also, the microphone 13e detects that the external DC power source 41a is connected and the power-source information is initialized by 0. The other microphones add 1 to the value of the power-source information. As a result, for the power-source information of the down data, the microphone 13a receives 0, the microphone 13b receives 5, the microphone 13c receives 6, the microphone 13d receives 7, and the microphone 13d stops power supply to the downstream microphone 13e. However, the external DC power source 41a is connected to the microphone 13e, and thus communication is possible. The microphone 13e resets the value of the power-source information by 0. However, the microphone 13e does not receive power supply from upstream, and thus 1 is further added and the value of the power-source information is set. For the power-source information of the down data, the microphone 13*f* receives 1, the microphone 13*f* receives 2, the microphone 13*h* receives 3, the microphone 13*i* receives 4, the microphone 13*j* receives 5, the microphone 13*k* receives 6, and the microphone 13*l* receives 7. When the microphone 13*l* adds an additional value (1) in accordance with the cable length, the result reaches the maximum number of units connected (8), and thus power is not supplied to the network microphone 13*m*. An external DC power source is not connected to the microphone 13*m*, and thus the microphone 13*m* is down.

In the second power-source system, microphones 14*a*, 14*b*, 14*c*, 14*d*, 14*e*, 14*f*, 14*g*, 14*h*, and 14*i* are connected by long cables 34*a* and 34*e*, and short cables 34*b*, 34*c*, 34*d*, 34*f*, 34*g*, 34*h*, and 34*i*. Also, an external DC power source 42*a* is connected to the microphone 14*d*. In this case, the microphones 14*a* and 14*e* detect that a long cable is connected, and thus 5 is added to the value of the power-source information. Also, the microphone 14*d* detects that the external DC power source 42*a* is connected and the power-source information is initialized by 0. The other microphones add 1 to the value of the power-source information. As a result, for the power-source information of the down data, the microphone 14*a* receives 0, the microphone 14*b* receives 5, the microphone 14*c* receives 6, and the microphone 14*d* receives 7. At this time, the microphone 14*d* receives power supply from upstream and the external DC power source 42*a* is connected, and the microphone 14*e* resets the value of the power-source information by 0. For the power-source information of the down data, subsequently, the microphone 14*e* receives 0, the microphone 14*f* receives 5, the microphone 14*g* receives 6, and the microphone 14*h* receives 7. When the microphone 14*h* adds an additional value (1) in accordance with the cable length, the result reaches the maximum number of units connected (8), and thus power is not supplied to the network microphone 14*i*. An external DC power source is not connected to the microphone 14*i*, and thus the microphone 14*i* is down.

In this regard, in the above description, an additional value is adjusted by detecting the length of the cable connected upstream. However, it is also possible to process in accordance with the length of the cable connected downstream.

As described above, according to the present embodiment, each microphone appropriately determines whether or not power is supplied to the downstream microphone in accordance with the power-source information of the down data, the length of the cable to which the self-microphone is connected, and the connection status of external DC power sources in order to perform power control autonomously.

As a result, it becomes possible to reduce troublesome work necessary for the setting of the power source.

It should be understood by those skilled in the art that various modifications, combinations, sub-combinations and alterations may occur depending on design requirements and other factors insofar as they are within the scope of the appended claims or the equivalents thereof.

What is claimed is:

1. A microphone system including a main unit for controlling the entire system and microphone apparatuses, having cascade connections from the main unit assuming the main-unit side to be upstream and the opposite side to be downstream, for transmitting sound signals in sequence, the microphone apparatus comprising:

communication control means for controlling down data transmitted from the main unit and up data transmitted to the main unit between the main unit or an upstream microphone apparatus and a downstream microphone apparatus if existent;

sound input means for converting collected sound into a digital signal to output as a sound-input signal;

echo cancellation means for eliminating an echo component mixed in the sound-input signal by using reference data to generate a sound signal; and sound-information generation means, if up data including sound information of the downstream microphone apparatus is obtained, for updating the sound information by adding the sound signal of said microphone apparatus to the sound information of the downstream microphone apparatus and upstream transmitting the up data including the updated sound information by the communication control means, wherein the microphone apparatus transmits the down data transmitted from the main unit to the down-most microphone apparatus in sequence in accordance with the cascade connection and transmits the up data from the down-most microphone apparatus to the main unit in reverse sequence, wherein when the communication control means obtains up data including number-of-units information indicating a quantity of microphone apparatuses connected downstream, the communication control means increases a value of the number-of-units information to update the up data and transmits the updated up data upstream, if said microphone apparatus is the down-most microphone apparatus, the communication control means transmits the up data having an initial value set in the number-of-units information upstream, and the main unit is configured to set the number-of-units information increased from the down-most microphone apparatus included in the obtained up data in the quantity of microphone apparatuses having cascade connections to the main unit.

2. The microphone system according to claim 1, wherein when the communication control means obtains down data including device information indicating a device-ID added in sequence of cascade connections, the communication control means sets a device-ID of the self-microphone apparatus based on the device information, increments the value of the device information to update the down data, and transmits the data to the downstream microphone apparatus, and the main unit transmits the down data in which an initial value is set in the device information, and identifies the target microphone apparatus using the device-ID set in the microphone apparatus based on the device information.

3. The microphone system according to claim 2, wherein the microphone apparatus further comprises command processing means, when the communication control means obtains down data including a command indicating an instruction contents to the microphone apparatus set by the main unit if necessary, for matching a specified device-ID set with the command and the device-ID of the self-microphone apparatus, and if matched, executing the processing on the command and creating responsive up data having the device-ID added to transmit the data to the upstream microphone apparatus.

4. The microphone system according to claim 3, wherein the command processing means performs adjustment of the sound input means including sound-volume adjustment, mute, microphone directivity in accordance with the instruction contents set by the main unit using the command.

5. The microphone system according to claim 1, wherein the sound-information generation means updates the sound information using the sound signal only when the sound signal is a significant sound satisfying a predetermined condition.

6. The microphone system according to claim 1, wherein the microphone apparatus further comprises power-source control means, when the communication control means obtains down data including power-source information indicating what number the microphone apparatus is connected from a predetermined power source, for determining whether or not a maximum number of connection units to the predetermined power source has been reached by the connection of the self-microphone apparatus based on the power-source information, if the connection is possible, transmitting the down data updated by incrementing the value of the power-source information to the downstream microphone apparatus and supplying power to the downstream microphone apparatus through a power cable, and if the connection is not possible, not supplying power to the downstream microphone apparatus.

7. The microphone system according to claim 6, wherein the power-source control means comprises external power-detection means for detecting whether a connection of an external power-source is provided, and when the external power-detection means detects a connection of the external power source, the power-source control means initializes the power-source information value to update the down data, transmits the data to the downstream microphone apparatus, and supplies power to the downstream microphone apparatus through the power cable.

8. The microphone system according to claim 6, wherein the power-source control means comprises power-cable-length detection means for detecting whether or not the power cable for supplying power is longer than a predetermined length, and the power-source control means changes the maximum number of connection units for being supplied power depending on whether or not the power cable detected by the power-cable-length detection means is longer than a predetermined length.

9. A microphone apparatus, having cascade connections from a main unit assuming the main-unit side for controlling the entire system to be upstream and the opposite side to be downstream, for transmitting sound signals in sequence, the microphone apparatus comprising:

communication control means for controlling down data transmitted from the main unit and up data transmitted to the main unit between the main unit or an upstream microphone apparatus and a downstream microphone apparatus if existent;

sound input means for converting collected sound into a digital signal to output as a sound-input signal;

echo cancellation means for eliminating an echo component mixed in the sound-input signal by using reference data to generate sound signal; and sound-information generation means, if up data including sound information of the upstream microphone apparatus is obtained, for updating the sound information by adding the sound signal of said microphone apparatus to the sound information of the downstream microphone apparatus and upstream transmitting the up data including the updated sound information, wherein when the communication control means obtains up data including number-of-units information indicating a quantity of microphone apparatuses connected downstream, the communication control means increases a value of the number-of-units information to update the up data and transmits the updated up data upstream, if the microphone apparatus is the down-most microphone apparatus, the communication control means transmits the up data having an initial value set in the number-of-units information upstream.

10. The microphone apparatus according to claim 9, wherein the sound-information generation means updates the sound information using the sound signal only when the sound signal represents a significant sound satisfying a predetermined condition.

11. The microphone apparatus according to claim 9, further comprising power-source control means, when the communication control means obtains down data including power-source information indicating what number the microphone apparatus is connected from a predetermined power source, for determining whether or not a maximum number of connection units to the predetermined power source has been reached by the connection of the self-microphone apparatus based on the power-source information, if the connection is possible, for transmitting the down data updated by incrementing the value of the power-source information to the downstream microphone apparatus and supplying power to the downstream microphone apparatus through a power cable, and if the connection is not possible, not supplying power to the downstream microphone apparatus.

12. The microphone apparatus according to claim 11, wherein the power-source control means comprises external power-detection means for detecting whether a connection of an external power-source is provided, and when the external power-detection means detects a connection of the external power source, the power-source control means initializes the power-source information value to update the down data, transmits the data to the downstream microphone apparatus, and supplies power to the downstream microphone apparatus through the power cable.

13. The microphone apparatus according to claim 11, wherein the power-source control means comprises power-cable-length detection means for detecting whether or not the power cable for supplying power is longer than a predetermined length, and the power-source control means changes the maximum number of connection units for being supplied power depending on whether or not the power cable detected by the power-cable-length detection means is longer than a predetermined length.

14. A microphone apparatus, having cascade connections from a main unit assuming the main-unit side for controlling the entire system to be upstream and the opposite side to be downstream, for transmitting sound signals in sequence, the microphone apparatus comprising:

communication controller for controlling down data transmitted from the main unit and up data transmitted to the main unit between the main unit or an upstream microphone apparatus and a downstream microphone apparatus if existent;

sound input part for converting collected sound into a digital signal to output as a sound-input signal;

echo canceller for eliminating an echo component mixed in the sound-input signal by using reference data to generate sound signal; and sound-information generator, if up data including sound information of the upstream microphone apparatus is obtained, for updating the sound information by adding the sound signal of said microphone apparatus to the sound information of the downstream microphone apparatus and upstream transmitting the up data including the updated sound information, wherein when the communication controller obtains up data including number-of-units information indicating a quantity of microphone apparatuses connected downstream, the communication control means increases a value of the number-of-units information to update the up data and transmits the updated up data upstream, if the microphone apparatus is the down-most microphone apparatus, the communication control means transmits the up data having an initial value set in the number-of-units information upstream.

* * * * *